United States Patent [19]

Gamo et al.

[11] 4,144,103

[45] Mar. 13, 1979

[54] METHOD OF MAKING A HYDROGEN STORAGE ALLOY AND PRODUCT

[75] Inventors: Takaharu Gamo, Fujiidera; Yoshio Moriwaki, Moriguchi; Toshio Yamashita, Katano; Masataro Fukuda, Toyonaka, all of Japan

[73] Assignee: Matsushita Electric Industrial Co., Ltd., Japan

[21] Appl. No.: 836,905

[22] Filed: Sep. 26, 1977

[30] Foreign Application Priority Data

Sep. 27, 1976 [JP] Japan .................................. 51-116395

[51] Int. Cl.² .............................................. C22F 1/02
[52] U.S. Cl. ..................................... 148/3; 75/134 M; 148/13; 148/20.3; 148/32
[58] Field of Search .................. 75/134 M; 148/3, 13, 148/20.3, 32

[56] References Cited

U.S. PATENT DOCUMENTS 2,267,298  12/1941  Dean .................................. 75/134 M Primary Examiner—R. Dean
Attorney, Agent, or Firm—Wenderoth, Lind & Ponack

[57] ABSTRACT

The present invention relates a method of making a hydrogen storage alloy comprising the steps of: preparing an alloy having, as main elements, 37 to 42 atomic percent of titanium and 58 to 63 atomic percent of manganese, which alloy is produced directly in an argon arc furnace or an induction furnace; heating the prepared alloy in an electric furnace at a high temperature below the melting temperature of the alloy under vacuum or an inert atmosphere; and cooling the heated alloy down to room temperature. The method of the present invention allows the alloy to have a homogeneous single phase, thereby providing an alloy with excellent hydrogen storage characteristics.

6 Claims, 7 Drawing Figures

METHOD OF MAKING A HYDROGEN STORAGE ALLOY AND PRODUCT

This invention relates to a method of making a hydrogen storage alloy, more particularly pertains to a Ti-Mn alloy system with excellent hydrogen storage characteristics and being low in cost.

It is already known that metals or alloys containing transition metals are able to store a large amount of hydrogen as metal hydrides. However, these hydrides are, in most cases, thermodynamically very stable so that they release hydrogen stored in the crystal lattice only at high temperatures such as 400° C. and above. The following are the requirements which the hydrogen storing material must satisfy.

1. The hydrogen absorbing capacity must be large both with respect to weight and volume.
2. It must be inexpensive.
3. The heat of formation of the hydride must be as low as possible.

Recently, hydrides of lanthanide alloys have been developed, but they were found to be unsuitable for industrial use because their production costs are extremely high, they are too heavy and are too sensitive to impurities in the hydrogen gas to be stored. Also, hydrides of conventional Ti-Fe alloys and Ti-Ni alloys do not satisfy the above conditions itemized in (1) and (3), and particularly they have a serious drawback of having comparatively less activation of hydrogen. This invention seeks to provide a method of making a novel hydrogen storage alloy, especially seeks to provide a method of making a Ti-Mn alloy system with excellent hydrogen storage characteristics and being low in cost.

The other objectives and features of this invention will be more apparent from the following detailed description of several preferred embodiments thereof when read in reference to the attached drawings, in which.

In the following, a detailed description of this invention will be made by reference to the drawings.

The present inventors have found that some alloy phases of Ti-Mn system especially Ti-Mn whose alloy phase is substantially uniform, which crystallize well, whose crystal structure is of C-14 type Laves phase, and in which the a and c parameters of the crystal lattice in the range, $a = 4.80 - 5.10 (\text{Å})$ and $c = 7.88 - 8.28 (\text{Å})$, are able to readily absorb large amount of hydrogen at room temperature and at a relatively low pressure of only about several times atmospheric pressure, and that the hydrides of this alloy phase release the abosorbed hydrogen at a suitably fast rate when the hydrides are placed under certain combined conditions of temperature and pressure.

Figure 1:
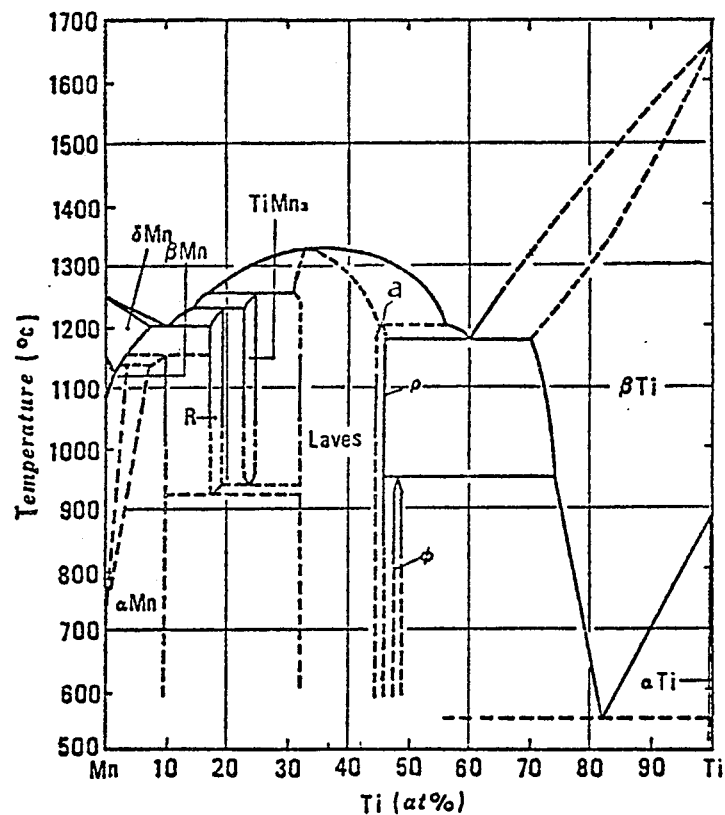
FIG. 1 is a phase diagram for a Ti-Mn alloy system.

The Ti-Mn alloy system has more varied alloy phases than other alloy systems as shown in FIG. 1, a phase diagram for the Ti-Mn system, and diffusion velocity of titanium atoms is relatively slow. Therefore, it is generally difficult to obtain a homogeneous, single Ti-Mn alloy system. In a composition ratio where the alloy with only one desired composition in C-14 type Laves pahse may be obtained, unless the titanium and manganese in a furnace is cooled down at a extremely low rate, the alloy has the distribution of compositions therein, thereby having in a C-14 type Laves phase, not only a desired composition but also undesired compositions, and further, point (a) in FIG. 1 moves to left, so that an eutectic is unavoidably produced in a composition where a formation of the eutectic is not expected. Each alloy with only one desired composition in C-14 type Laves phase can have the excellent hydrogen storage characteristics, whereas the alloy having the above described distributions of compositions has inferior characteristics because the different characteristics of each alloy compositions are averaged. The above-described eutectic is composed of a $\rho$ phase (or $\phi$ phase or the other Laves phase) and a $\beta$ Ti phase. The formation of a eutectic in the alloy affects adversly the hydrogen storage characteristics of the alloy. The more the cooling rate increases, the larger the degree of transportation of point (a), and the more the eutectic occurs in the alloy. For the reason, it is difficult to obtain the alloy with above-described homogeneous and single C-14 type Laves phase unless the alloy is cooled down at an extremely low cooling rate. It is extremely difficult to make a furnace which is able to cool down the dissolved alloy at such the low cooling rate. Moreover, if the alloy is cooled at such a low cooling rate, it requires a very long time to make the alloy and therefore it is impractical to employ such the method.

This invention is intended to provide a method which allows the alloy to have the above-described homogeneous and single C-14 type Laves phase in order to impart to it excellent hydrogen storage characteristics, without exploying such long cooling period.

The method of this invention comprises the steps of: preparing an alloy having a particular composition of titanium and manganese, heating the prepared alloy at a high temperature below the melting temperature of the alloy, under vacuum or in an inert atmosphere, and cooling the heated alloy to normal temperature. Hereinafter, the heating and cooling steps in this method are simply referred to as heat treatment.

Because the hydrogen storage alloy obtained by the method according to this invention has generally homogeneous and single C-14 type Laves phase, it can absorb and release a large amount of hydrogen as compared with the non-heat treated alloy. Further, the region where hydrogen dissociation equilibrium pressure is constant, so-called plateau region, becomes wider, and moreover, the alloy can have extremely good hydrogen storage characteristics.

Figure 2A:
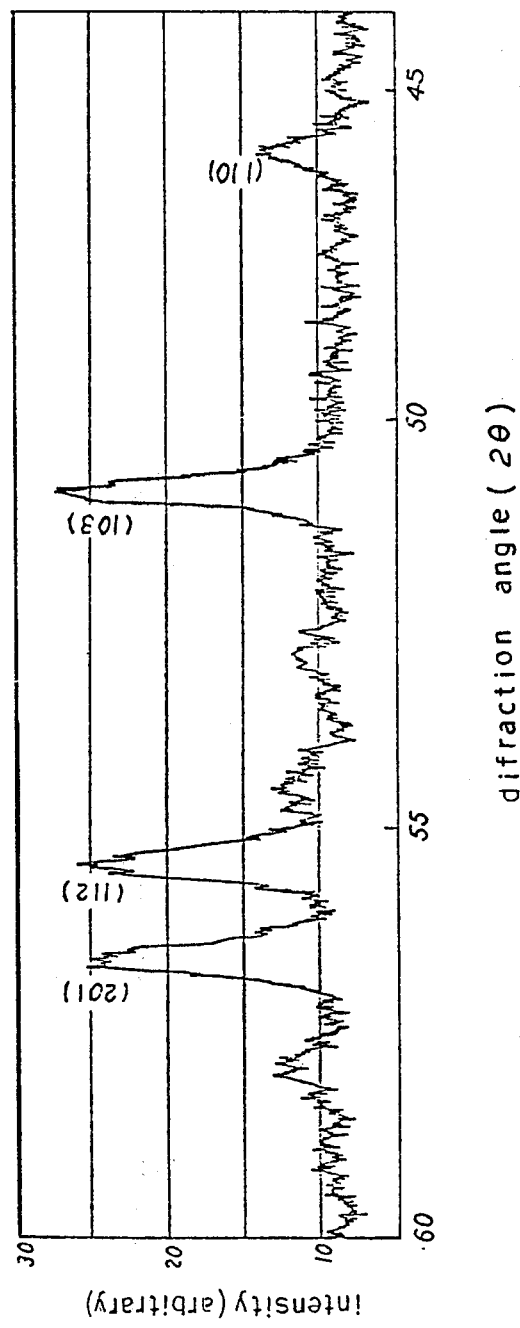
FIGS. 2A and 2B show X-ray diffraction patterns for $TiMn_{1.5}$ alloys manufactured by methods without heat treatment and with heat treatment, respectively.
Figure 2B:
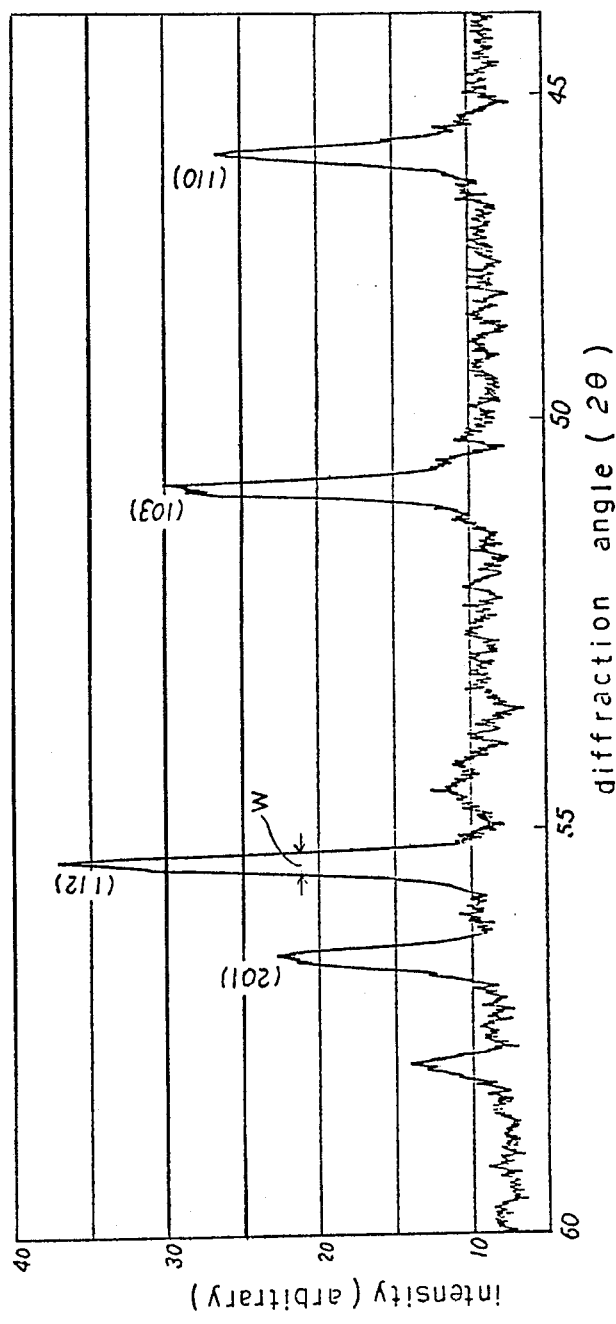

In order to make clear the effectiveness of the heat treatment according to the invention, X-ray diffraction patterns of $TiMn_{1.5}$ having the composition of 40 atomic percent titanium, are obtained by the use of $FeK\alpha$ rays, as shown in FIG. 2. FIG. 2A is the pattern of the non-heat treated alloy and FIG. 2B, that of the heat treated alloy. Reference numerals given to peaks indicate a lattice plane index.

From FIGS. 2A and 2B, it is known that height of any peaks and half width (W) thereof for the heat treated alloy become higher and smaller, respectively, as compared with these of the non-heat treated alloy. This experimental result reveals that the heat treatment according to the invention is fairly effective to make the alloy phase homogeneous and single.

Figure 3:
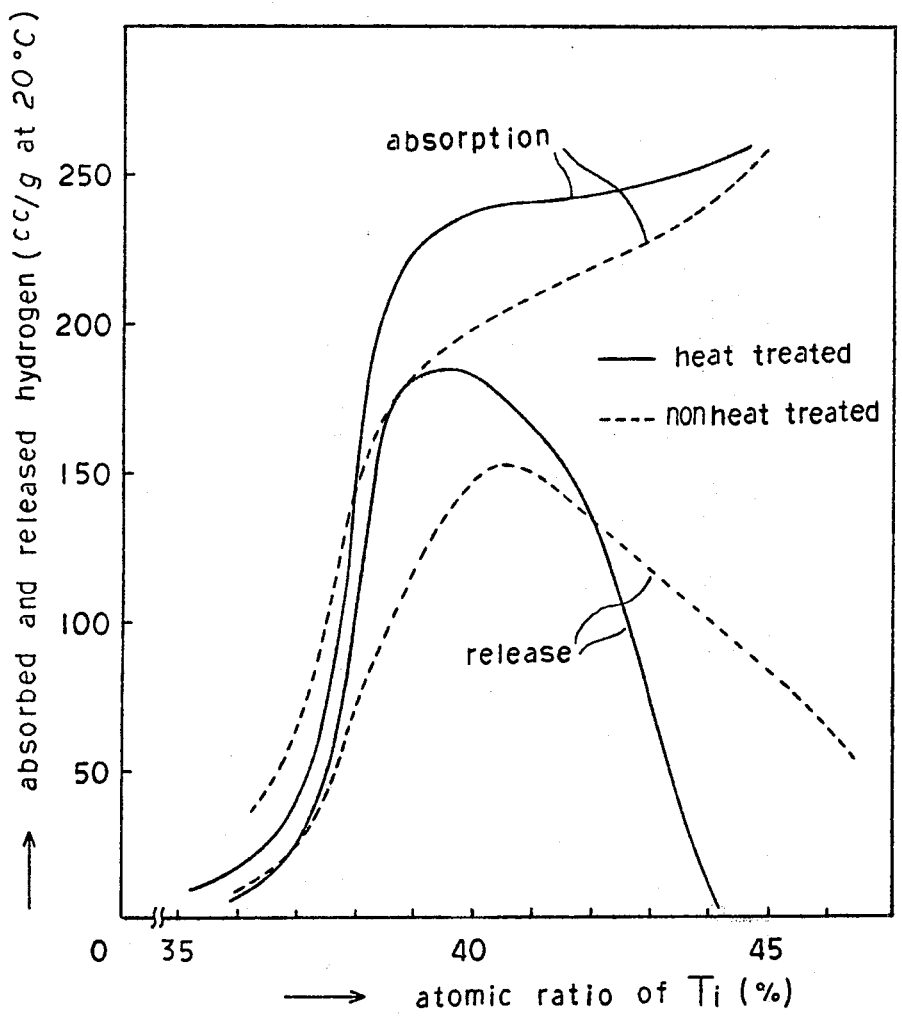
FIG. 3 is a graph which plots the relationship of the amount of absorbed hydrogen and released hydrogen (cc/g) at a temperature of 20° C. against the atomic percent of titanium in the Ti-Mn alloy system.

In the following, there will be described the composition range where the heat treatment of this invention permits the alloy to have the homogeneous single C-14 type Laves phase. Shown in FIG. 3 is the relationship between atomic percent of titanium in the Ti-Mn system slloy and the amount of absorbed and released hydrogen at 20° C. In FIG. 3, solid lines indicate the hydrogen absorbing and releasing characteristics of the heat treated alloy, and dashed line, that of the non-heat treated alloy.

In considering an alloy utitizable as a hydrogen storage material, it becomes important to determine how much hydrogen per unit weight of the alloy is released at room temperature under atmospheric pressure. Referring to FIG. 3, it is known that the maximum amount of released hydrogen is at around 39 to 40 atomic percent of titanium and that of the heat treated alloy is greater than that of non-heat treated alloy in the range of about 37 to 42 atomic percent of titanium. Therefore, it can be said that the heat treatment of this invention renders notable effects to the alloy falling within this composition range.

Where the Ti-Mn alloy system is exposed oxygen at a high temperature, the alloy is oxidized, so that hydrogen absorbing and releasing characteristics of the alloy are deteriorated because the oxidized layer prevents absorption of hydrogen. In order to avoid oxidization of the alloy, it is necessary to heat the alloy under vacuum or in inert atmosphere such as helium or argon.

In the following, there will be described the heating temperature needed to obtain the intended effect. If the heating temperature rises to above the melting temperature of the alloy having the desired composition, this step becomes the same as the former dissolving step, thereby causing the above-described problem. Namely, in the cooling step, unless the alloy is cooled across a solid-liquid phase line at an extremely low rate, the eutectic is produced in the alloy.

Accordingly, it is difficult to obtain the alloy having the desired characteristics. For the reason, the alloy should be heated at a temperature below a melting temperature of the alloy.

Furthermore, when the heating temperature is equal to or higher than 1175° C. which is a minimum dissolution temperature of the ($\rho + \beta$ Ti) phase shown in FIG. 1, the nonhomogeneous phase including the eutectic composed of the $\beta$ Ti phase and the $\rho$ phase is in liquid state, so that the diffusion velocity thereof become larger. Therefore, the $\beta$ Ti phase and the $\rho$ phase can diffuse faster toward the desired C-14 type Laves phase. Moreover, where the heating temperature is equal to or higher than 950° C. and below 1175° C., the eutectic ($\rho + \beta$ Ti) phase in the nonhomogeneous phase is in solid state. The $\rho$ phase constituting the eutectic has the same hexagonal system as that of the desired C-14 type Laves phase. Therefore diffusion of the ($\rho + \beta$ Ti) phase into the C-14 type Laves phase is made relatively easy. On the other hand, if the temperature is below 950° C., an eutectic of ($\phi + \beta$ Ti) phase occurs in the alloy. since $\phi$ phase has tetragonal system which differs from hexagonal system, the diffusion of the ($\phi + \beta$ Ti) is rather hard. However, even though heating is performed at a temperature below 950° C., the distribution of the alloy compositions in the C-14 type Laves phase is made uniform so that a certain measure of the effect may be obtained by the heat treatment.

Accordingly, the heating temperature should be higher in the range below the melting temperature of the desired alloy composition in view of the fact that the degree and the velocity of the such diffusion become larger and higher with increase of the heating temperature. In the composition range described above, if the content of titanium is 37 atomic percent, the melting temperature is 1310° C., as will be seen from FIG. 1.

Figure 4:
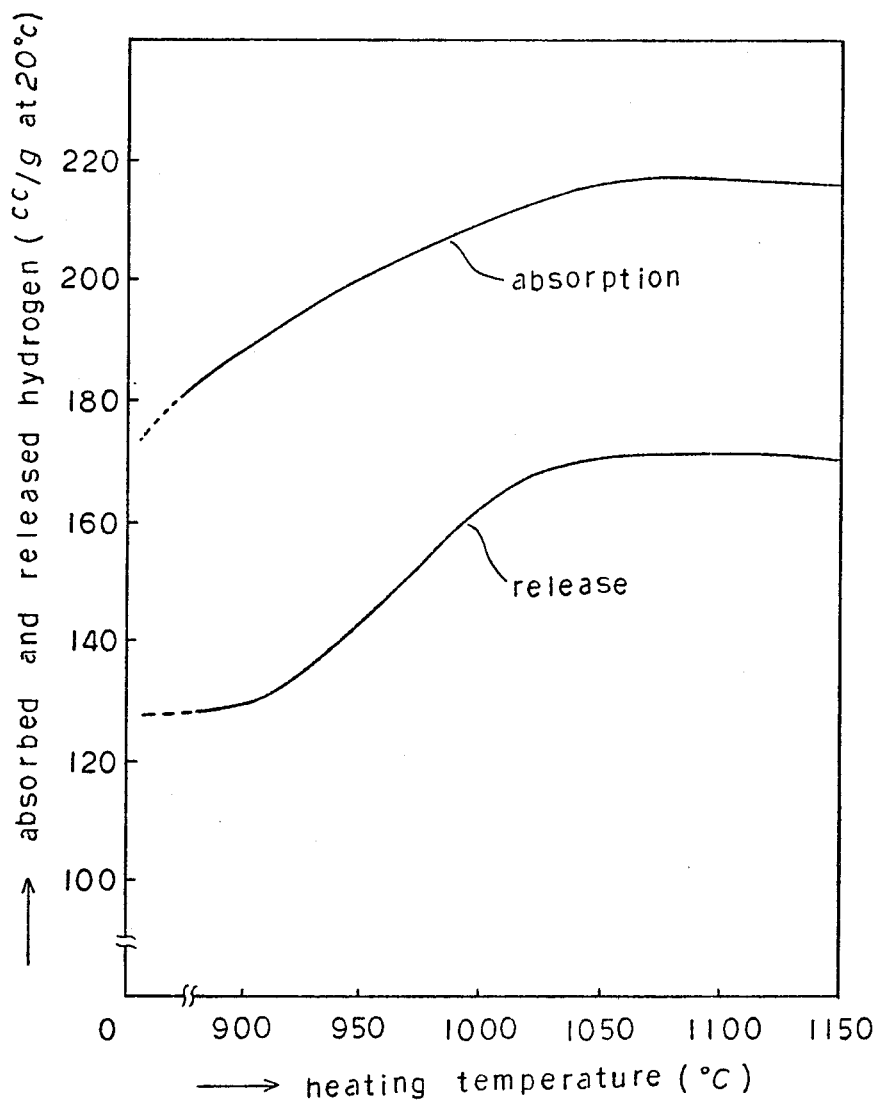
FIG. 4 is a graph showing the relationship of the amount of absorbed hydrogen and released hydrogen (cc/g) to the heating temperature, for $TiMn_{1.5}$.

FIG. 4 is a graph showing the relationship between the amount of absorbed and released hydrogen per unit weight of the alloy at 20° C. under atmospheric pressure and a heating temperatures for the TiMn$_{1.5}$ alloy heated at various temperatures under vacuum for 50 hours and then rapidly cooled down to room temperature. Paying attention to the amount of released hydrogen in FIG. 4, it was determined that the heat treatment produces the intended effect at a heating temperature more than 900° C. Accordingly, the range of heating temperature should be 900° C. to 1310° C. for TiMn$_{1.5}$ alloy.

The length of the heating period is dependent on the heating temperature and the heating period to obtain the intended effect becomes shorter with rising the heating temperature.

In the following, there will be described about the cooling rate to obtain the intended effect.

Table 1 shows the amount of absorbed and released hydrogen for TiMn$_{1.5}$ alloys cooled at a relatively high rate of about 150° C. per minute and at relatively low rate of about 5° C. per minute.

Table 1

| cooling rate | temperature of alloy(° C) | amount of absorbed hydrogen (cc/g) | amount of released hydrogen (cc/g) |
|---|---|---|---|
| rapidly cooled | 0 | 239.8 | 179.9 |
|  | 40 | 216.4 | 171.3 |
| gradually cooled | 0 | 237.4 | 171.9 |
|  | 40 | 208.3 | 151.9 |

As will be seen from Table 1 the rapidly cooled alloy can absorb and release a much larger amount of hydrogen than gradually cooled one. Such the difference in the effect results from the fact that in the cooling step, a slow passing across the boundary of phase transformation line in FIG. 1 transmutes the portion of the alloy phase to a stable phase and therefore the nonhomogeneous phase other than the desired composition is formed. Accordingly, if the cooling rate of the heat treatment hence is large, the thus obtained alloy shows much better hydrogen storage characteristics. In addition, it is preferable to make the cooling rate high in shortening the period for making the alloy.

Hereinafter, examples of this invention will be described.

EXAMPLE 1

There was prepared a bar of 99% pure titanium having a 8 mm diameter and a 10 mm length, and a plate of 99% pure electrolytic manganese having a 1.5 mm thickness and a 100 mm$^2$ cross section.

These titanium bars and manganese plates were put into a water-cooled crucible made of copper and were dissolved by arc in argon atmosphere. During this dissolving process, a button consists of a Ti-Mn alloy was turned up several times.

Then, the button was divided into several pieces and further dissolved. These steps in the dissolving process were repeated several times to make the alloy uniform. With the thus made alloy, it appears that it is homogeneous and has a single phase. In fact, however, it can be seen from metal microscope observation, that the alloy is not homogeneous and not in a single phase because of inclusion of $\beta$ Ti phase and C-14 Laves phase, other than the desired C-14 type.

Figure 5:
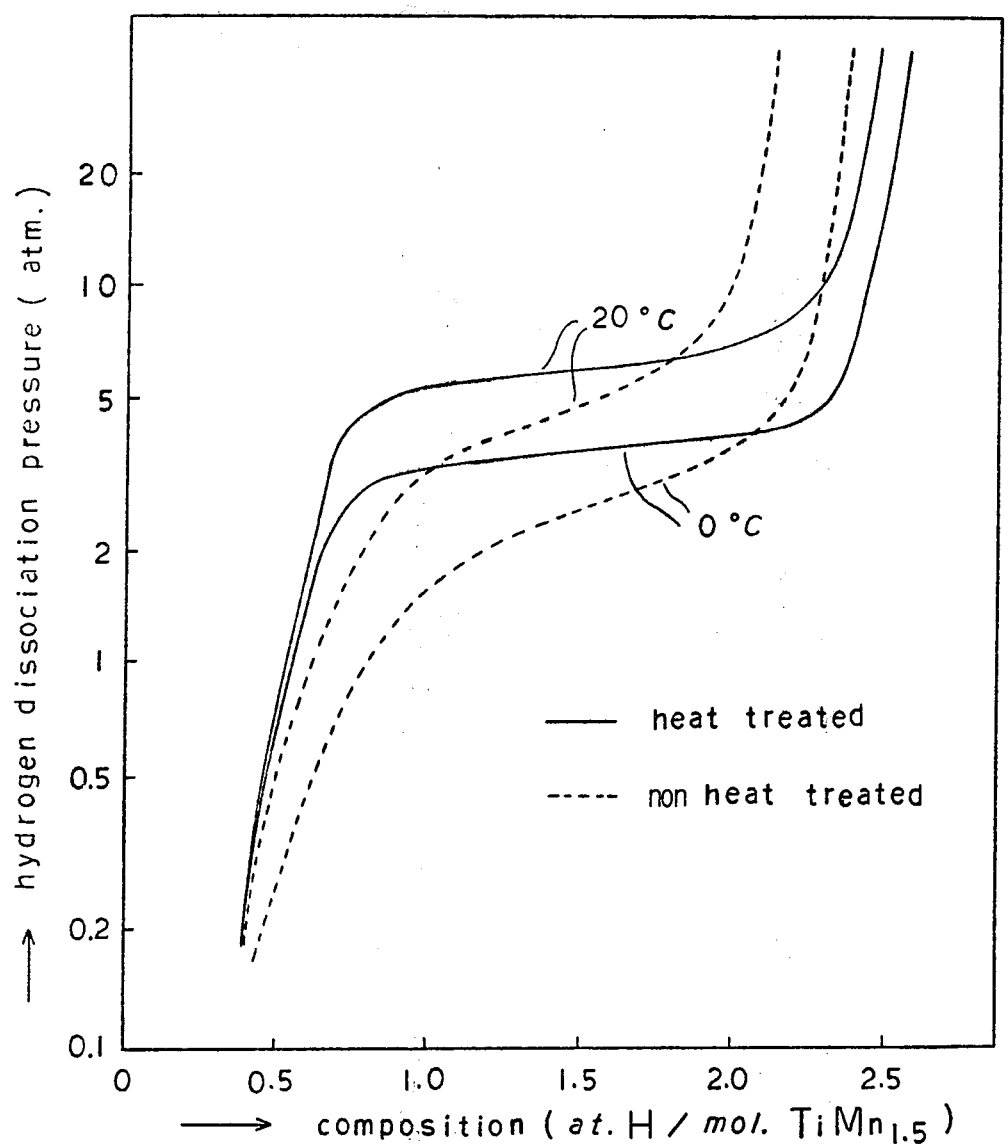
FIG. 5 is a graph showing the relationship between the hydrogen dissociation equilibrium pressure and the composition for the system $TiMn_{1.5}$-H at a temperature of 0° C. and 20° C.

The alloy was put into quartz ampule under vacuum and was heated at a temperature of 1100° C. for 25 hours in a electric furnace. Then, the heated alloy was rapidly cooled in ice-water. A X-ray diffraction pattern of alloy made in this way exhibits sharp peaks as shown in FIG. 2B, and this means that the alloy has a relatively homogeneous, and single phase. The heat treated alloy was subjected to the treatment to form a hydride. There is shown in FIG. 5 the hydrogen storage characteristics, at ambient temperatures of 0° C. and 20° C., of thus heat treated alloy and the non-heat treated alloy. In FIG. 5, logarithms of the hydrogen dissocation equilibrium pressures (P) are plotted along the longitudinal axis, and number of the hydrogen atoms per molecule of alloy (X = H/TiMn$_{1.5}$), along the transverse axis.

The flat region on each isotherm is the plateau region in which the pressure is substantially constant. In the range of plateau pressure, the alloy absorbs and releases a relatively large amount of hydrogen reversibly in spite of a slight change of the pressure. If the plateau region is sufficiently flat and wide, the alloy can release a large amount of hydrogen.

FIG. 5 shows the P-X-T characteristic which indicates the level of a hydrogen storage ability of the alloy. From FIG. 5, it will be seen that the alloy made by the method of this invention has little non-homogeneous phase and has the C-14 type Laves phase only, that it is improved in expansion of the plateau region and flatness thereof, and that the amount of absorbed hydrogen per 1 mol of TiMn$_{1.5}$ increases by about 20% at room temperature and the amount of released hydrogen per 1 mol of TiMn$_{1.5}$ increases by about 18% as compared with the non-heat treated alloy.

EXAMPLE 2

There was prepared an alloy of TiMn$_{1.6}$ including about 38 percent of titanium, the alloy being obtained by the same dissolving process as in Example 1. The prepared alloy was heated at a temperature of 1100° C. for 50 hours in an electric furnace in argon gas atmosphere at a gas flow rate of 1.0 mol/min. Then, the heated alloy was rapidly cooled to room temperature in ice-water. Thereafter, the cooled alloy was subjected to the treatment for forming a hydride.

Figure 6:
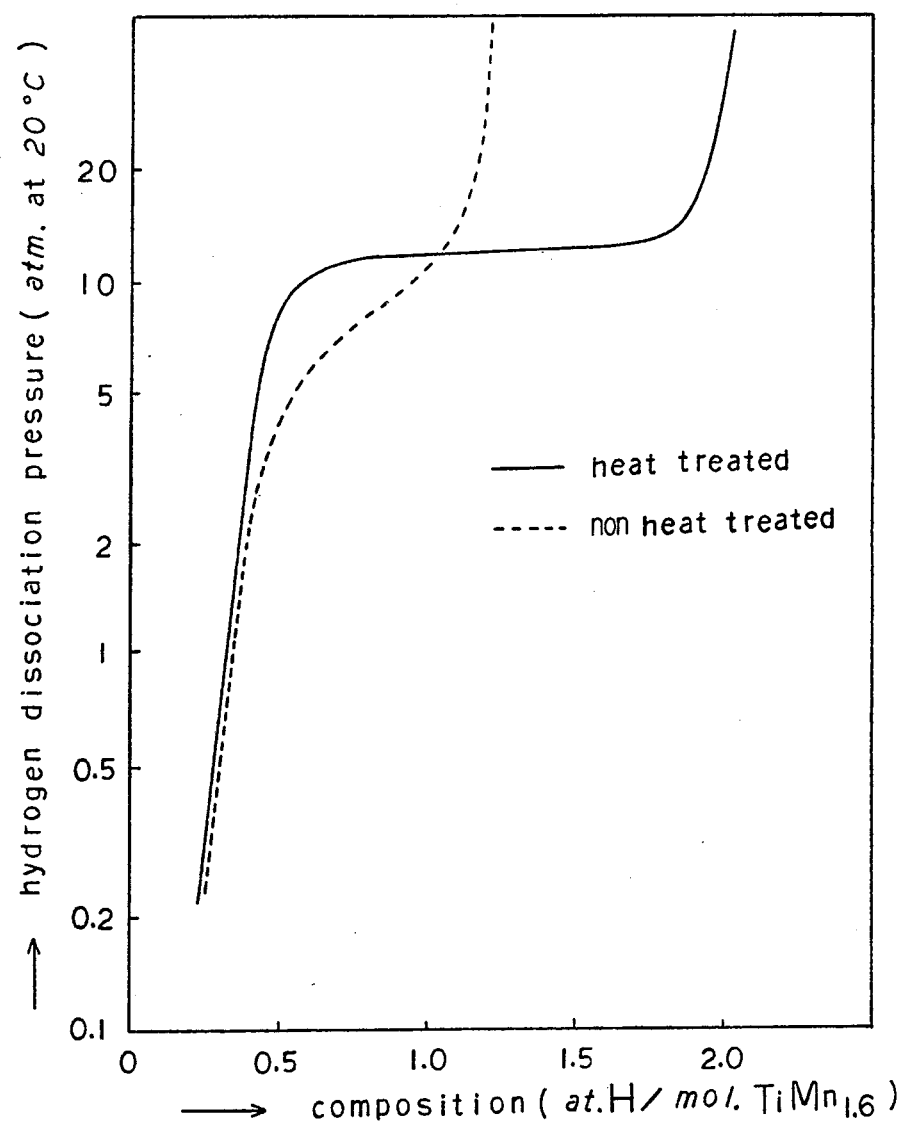
FIG. 6 is a graph showing the relationship between the hydrogen dissociation equilibrium pressure and the composition for the system $TiMn_{1.6}$-H at a temperature of 20° C.

There is shown in FIG. 6, a graph showing the relationship between the hydrogen dissociation equilibrium pressure and the composition for the system TiMn$_{1.6}$—H. From FIG. 6, it can be shown that an alloy made by the method of present invention is fairly improved in expansion of the plateau region and flatness thereof as compared with the non-heat alloy and that the alloy absorbs and releases a large amount of hydrogen under atmospheric pressure as in Example 1.

As described in the foregoing, the method of this invention allows the Ti-Mn system alloy to have the homogeneous and single phase so that an alloy with excellent hydrogen storage characteristics may be obtained.

The method of this invention is applicable not only to the two component system but also to a three or more component system.

What we claim is:

1. A method of making a hydrogen storage alloy comprising the steps of: preparing an alloy consisting essentially of 37 to 42 atomic percent of titanium and 58 to 63 atomic percent of manganese; heating the alloy at a high temperature below the melting temperature of the alloy under vacuum or in an inert atmosphere; and cooling the heated alloy to room temperature, whereby a homogeneous single C-14 type Laves phase is produced.

2. A method of making a hydrogen storage alloy according to claim 1, wherein said alloy has 39 to 40 atomic percent of titanium.

3. A method of making a hydrogen storage alloy according to claim 1, wherein said cooling is performed at a high cooling rate.

4. A method of making a hydrogen storage alloy according to claim 1, wherein said heating is performed at a temperature equal to or more than 1175° C.

5. A method of making a hydrogen storage alloy according to claim 1, wherein said heating is performed at a temperature of more than 900° C.

6. A hydrogen storage alloy manufactured by the method of claim 1.

* * * * *